(12) United States Patent
McGahey

(10) Patent No.: US 8,739,948 B2
(45) Date of Patent: Jun. 3, 2014

(54) SUPPORT WASHER FOR SHOCK ABSORBER VALVE WITH BLOW-OFF TUNABILITY

(75) Inventor: John Patrick McGahey, Trenton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 334 days.

(21) Appl. No.: 13/020,822

(22) Filed: Feb. 4, 2011

(65) Prior Publication Data

US 2012/0199430 A1    Aug. 9, 2012

(51) Int. Cl.
*F16F 9/34* (2006.01)

(52) U.S. Cl.
USPC .................. 188/322.13; 188/280; 188/282.5; 188/282.6; 188/282.8; 188/313; 188/315; 188/316; 188/320; 188/322.15; 267/64.13; 267/64.26; 267/186

(58) Field of Classification Search
USPC ............. 188/322.13, 322.15, 322.16, 322.22, 188/282.1, 282.5, 282.6, 282.2, 299.1, 188/266.4, 266.2, 315, 280, 317
See application file for complete search history.

(56) References Cited

U.S. PATENT DOCUMENTS

| | | | | |
|---|---|---|---|---|
| 4,724,937 A * | 2/1988 | Fannin et al. | ............... | 188/282.5 |
| 4,993,524 A * | 2/1991 | Grundei et al. | ............ | 188/282.6 |
| 5,085,412 A * | 2/1992 | Peterson et al. | ........... | 267/64.26 |
| 5,547,050 A * | 8/1996 | Beck | .......................... | 188/282.5 |
| 5,738,190 A | 4/1998 | Deferme | | |
| 6,202,805 B1 | 3/2001 | Okada et al. | | |
| 6,371,264 B1 * | 4/2002 | Deferme | .................. | 188/322.15 |
| 6,733,395 B2 | 5/2004 | Thomas et al. | | |
| 2001/0009214 A1 * | 7/2001 | Tanaka | ........................ | 188/275 |
| 2005/0279597 A1 * | 12/2005 | Yamaguchi | .............. | 188/322.13 |
| 2008/0149438 A1 * | 6/2008 | Chikamatsu et al. | ......... | 188/313 |
| 2009/0236194 A1 * | 9/2009 | Kim | ......................... | 188/322.15 |

OTHER PUBLICATIONS

Search Report and Written Opinion dated Aug. 20, 2012 in corresponding PCT Application No. PCT/US2012/021647.

* cited by examiner

*Primary Examiner* — Robert A Siconolfi
*Assistant Examiner* — San Aung
(74) *Attorney, Agent, or Firm* — Harness, Dickey & Pierce, P.L.C.

(57) ABSTRACT

A valve assembly for a shock absorber includes a valve body defining a fluid passage. A valve disc engages the valve body to close the fluid passage. A fulcrum disc engages the valve disc at a first position and a second position radially outward from the first position. The fulcrum disc is designed such that the second position is closer to the valve body. In one embodiment, the fulcrum disc is concave with respect to the valve body.

24 Claims, 6 Drawing Sheets

SUPPORT WASHER FOR SHOCK ABSORBER VALVE WITH BLOW-OFF TUNABILITY

FIELD

The present disclosure is directed to a valve assembly for a shock absorber. More particularly, the present disclosure is directed to a valve assembly for a shock absorber which includes a support washer which is used to tune the damping characteristics created by the valve assembly.

BACKGROUND

This section provides background information related to the present disclosure which is not necessarily prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is connected to the sprung mass of the vehicle through a piston rod. The pressure tube is connected to the unsprung mass of the vehicle. The piston divides the pressure tube into an upper working chamber and a lower working chamber. The piston includes compression valving which limits the flow of damping fluid from the lower working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced by a compression fluid valve assembly. In addition to the compression valving, the base valve assembly also includes a rebound fluid valve assembly. The compression valving of the base valve assembly produces damping force during a compression stroke, and the rebound valving of the piston produces damping force during a rebound or extension stroke. Both the compression and rebound fluid valve assemblies permit fluid flow in one direction, but prohibit fluid flow in an opposite direction; however, they are typically designed such that they do not generate a damping force but they may be designed to contribute to the generation of the damping force.

The valving for the shock absorber which determines the damping loads whether it is part of the piston assembly or the base valve assembly typically comprises one or more valve discs which is/are clamped or otherwise urged against an inner land or hub by some type of a retainer. When the inner portion of the valve disc is clamped or urged against the inner land or hub, the outer portion of the valve disc is biased against an outer land. The assembly of the valve discs against the lands defines flow restriction contours by means of the achieved interaction with the bending of the valve disc or the valve disc stack.

The pressure required to lift the valve discs off of the valve land is a key tuning feature for the shock absorber valve. With clamped discs that are clamped at their inner portion, this pressure control is typically done by adjusting the axial distance between the inner land or hub and the outer land of the piston or base valve. This difference in axial distance acts to apply a specified pre-stress to the valve discs allowing some pressure build up before the valve discs deflect and the valve opens. However, piston tooling is expensive and piston change-overs in production can be more time consuming than other valve components. This complicates the tuning of the shock absorber because any change in the axial distance between the inner land or hub and the outer land will require a new piston. The continued development of valve assemblies includes a new method of controlling the pre-stress applied to the valve discs which is lower in cost and easier to accommodate changes in the amount of pre-stress.

SUMMARY

This section provides a general summary of the disclosure, and is not a comprehensive disclosure of its full scope or all of its features.

The present disclosure provides the art with a support washer which can be configured to control the pre-stress on the valve discs which in turn controls the damping characteristics of the valve assembly.

In a clamped disc valve, the deflecting valve discs bend around a fulcrum diameter during valve opening. This fulcrum diameter can be larger than the clamping diameter on the hub of the piston or base valve. When a fulcrum disc or support washer is used to define the fulcrum diameter, a concave support washer can be used to pre-stress the valve discs onto the outer land. The amount of concavity of the support washer will control the amount of pre-stress and thus the amount of pressure required to lift the valve disc off of the valve land. The more concavity, the more pre-stress and the higher pressure required to lift the valve disc off the land.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

Figure 1:
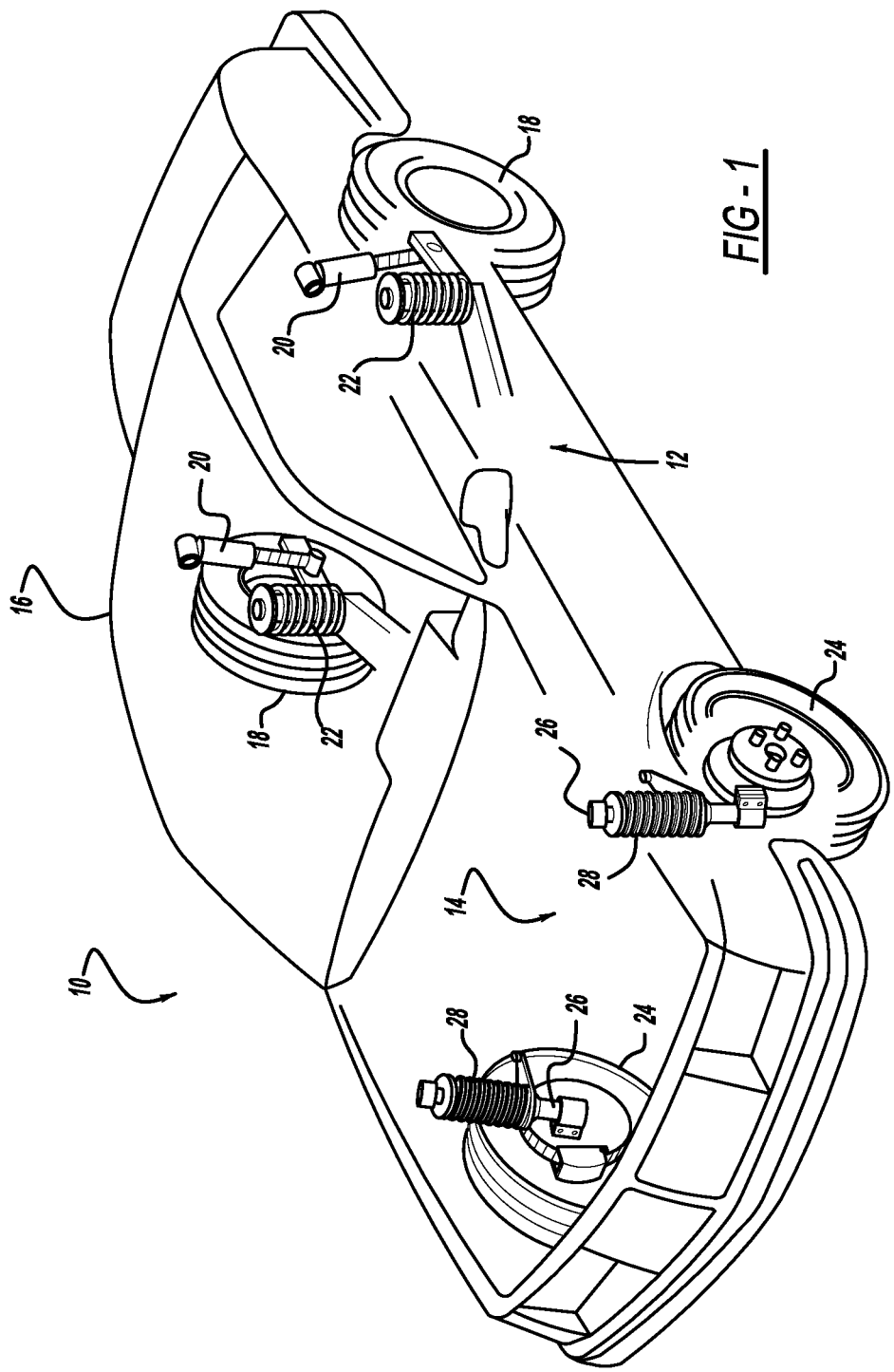
FIG. 1 is a schematic representation of a typical automobile which incorporates at least one shock absorber measured by a device in accordance with the present invention.

Referring now to the drawings in which like reference numerals designate like or corresponding parts throughout the several views, there is shown in FIG. 1 a vehicle which includes a suspension system incorporating the shock absorbers which have valve assemblies in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
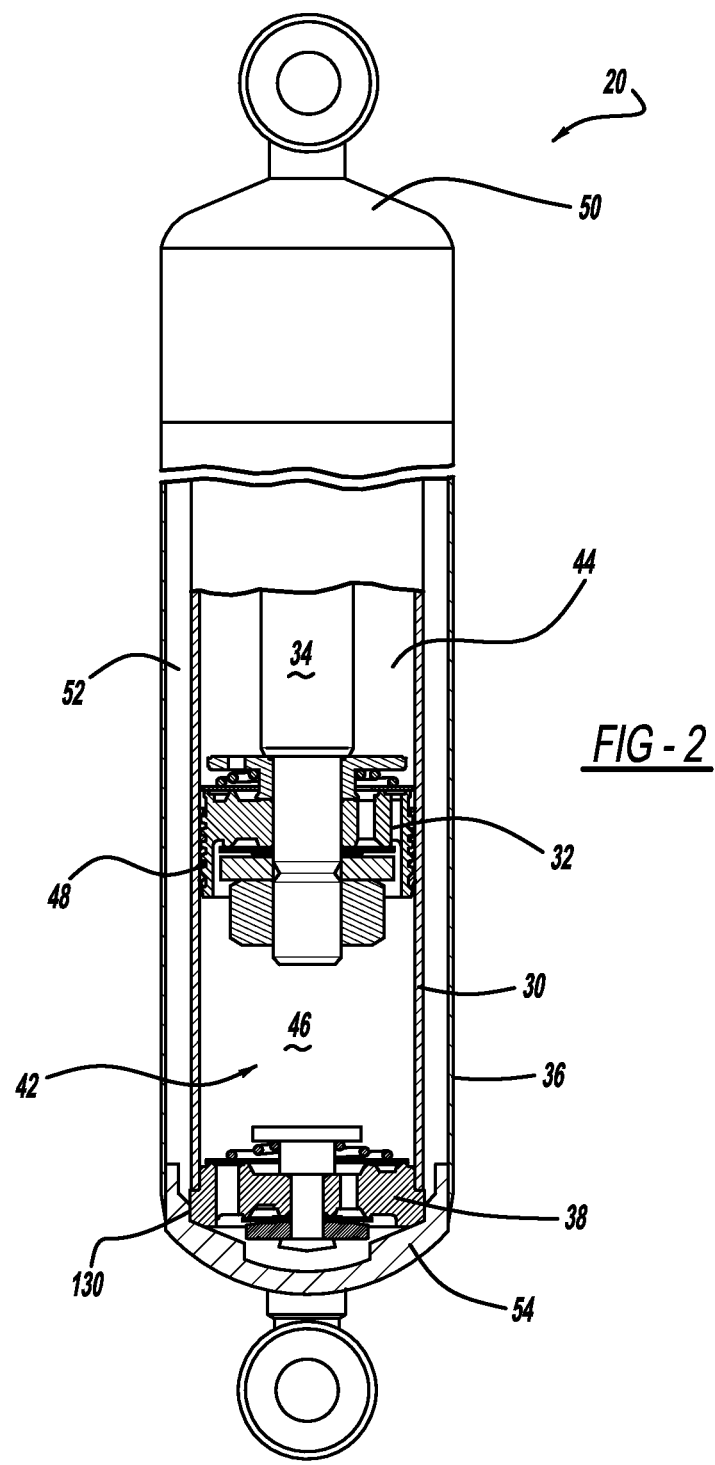
FIG. 2 is a side sectional view of the shock absorber in accordance with the present invention.

Referring now to FIG. 2, shock absorber 20 is shown in greater detail. While FIG. 2 illustrates only shock absorber 20, it is to be understood that shock absorber 26 also includes the valve assemblies described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reservoir tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through upper end cap 50 which closes the upper end of pressure tube 30 and the upper end of reservoir tube 36. A sealing system seals the interface between upper end cap 50, reservoir tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
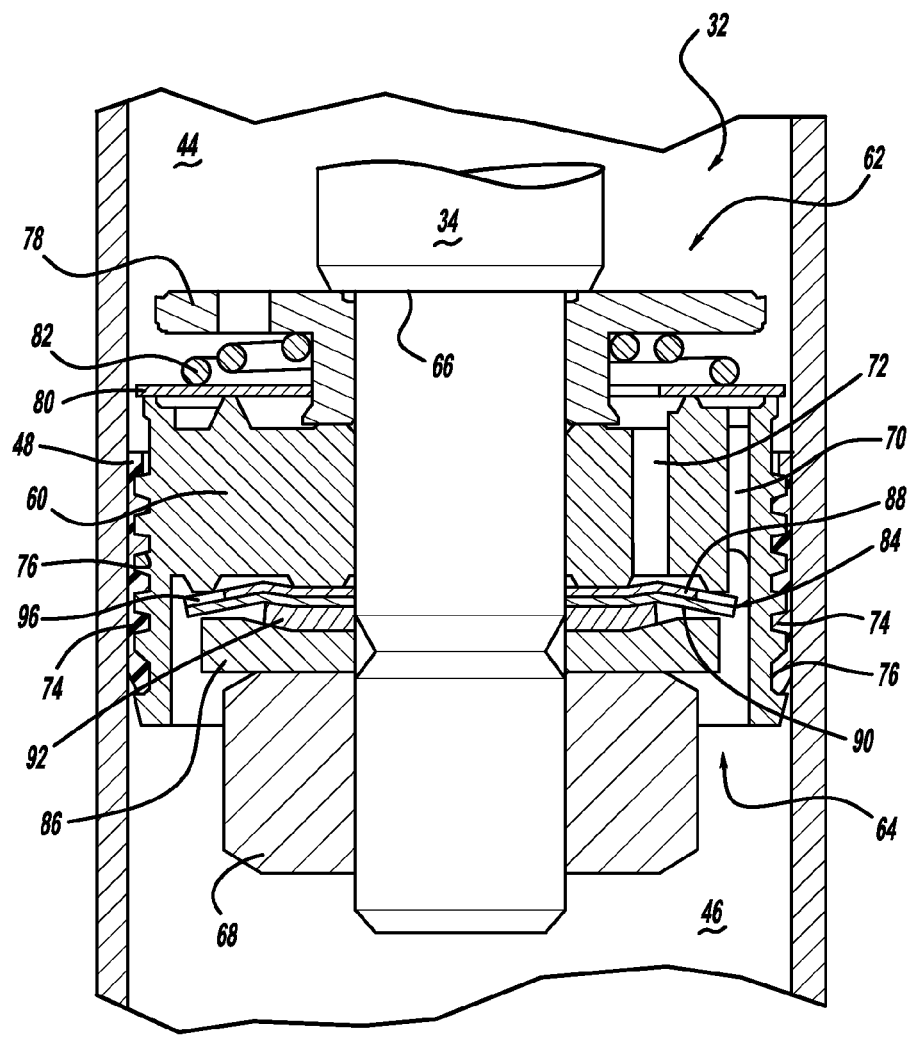
FIG. 3 is an enlarged cross-sectional view of the piston assembly in accordance with the present invention.

Referring now to FIG. 3, piston assembly 32 comprises a valve body 60, a compression fluid valve assembly 62 and a rebound valve assembly 64. Compression fluid valve assembly 62 is assembled against a shoulder 66 on piston rod 34. Valve body 60 is assembled against compression fluid valve assembly 62 and rebound valve assembly 64 is assembled against valve body 60. A nut 68 secures these components to piston rod 34.

Valve body 60 defines a plurality of compression passages 70 and a plurality of rebound passages 72. Seal 48 includes a plurality of ribs 74 which mate with a plurality of annular grooves 76 to permit sliding movement of piston assembly 32.

Compression fluid valve assembly 62 comprises a retainer 78, a valve disc 80 and a spring 82. Retainer 78 abuts shoulder 66 on one end and valve body 60 on the other end. Valve disc 80 abuts valve body 60 and closes compression passages 70 while leaving rebound passages 72 open. Spring 82 is disposed between retainer 78 and valve disc 80 to bias valve disc 80 against valve body 60. During a compression stroke, fluid in lower working chamber 46 is pressurized causing fluid pressure to react against valve disc 80. When the fluid pressure against valve disc 80 overcomes the biasing load of spring 82, valve disc 80 separates from valve body 60 to open compression passages 70 and allow fluid flow from lower working chamber 46 to upper working chamber 44. Typically spring 82 only exerts a light load on valve disc 80, and it does not contribute to damping characteristics for shock absorber 20 although compression fluid valve assembly can be designed to contribute to damping characteristics for shock absorber 20. Damping characteristics for shock absorber 20 during a compression stroke are created by base valve assembly 38 which accommodates the flow of fluid from lower working chamber 46 to reservoir chamber 52 due to the "rod volume" concept as detailed below. During a rebound stroke, compression passages 70 are closed by valve disc 80.

Rebound valve assembly 64 comprises a plurality of valve members 84 and a retainer 86. Retainer 86 is disposed between valve members 84 and nut 68. Valve members 84 are slidingly received on piston rod 34 and abut valve body 60 to close rebound passages 72 while leaving compression passages 70 open. Retainer 86 is also slidingly received on piston rod 34 and it abuts valve members 84. Nut 68 clamps retainer 86 against valve members 84 and valve members 84 against valve body 60. The plurality of valve members 84 comprise a bleed disc 88, a valve disc 90 and a fulcrum 92. Bleed disc 88 includes at least one slot 96 which permits a limited amount of bleed flow bypassing rebound valve assembly 64. Fulcrum 92 provides a fulcrum or bending point for bleed disc 88 and valve disc 90. When fluid pressure is applied to discs 88 and 90, they will elastically deflect at the outer peripheral edge of fulcrum disc 92 to open rebound valve assembly 64.

During a rebound stroke, fluid in upper working chamber 44 is pressurized causing fluid pressure to react against valve discs 88 and 90. A controlled amount of fluid will flow through slot 96 of bleed disc 88. Once the flow through slot 96 is saturated, fluid pressure will increase in upper working chamber 44. When the fluid pressure reacting against valve discs 88 and 90 overcomes the bending load for valve discs 88 and 90, valve discs 88 and 90 elastically deflect opening rebound passages 72 allowing fluid flow from upper working chamber 44 to lower working chamber 46. The stiffness of valve discs 88 and 90, the size of rebound passages 72 and the design of fulcrum 92 will determine the damping characteristics for shock absorber 20 in rebound. Prior to the deflection of valve discs 88 and 90, a controlled amount of fluid flows from upper working chamber 44 to lower working chamber 46 through slot 96 to provide low speed tunability.

Figure 4:
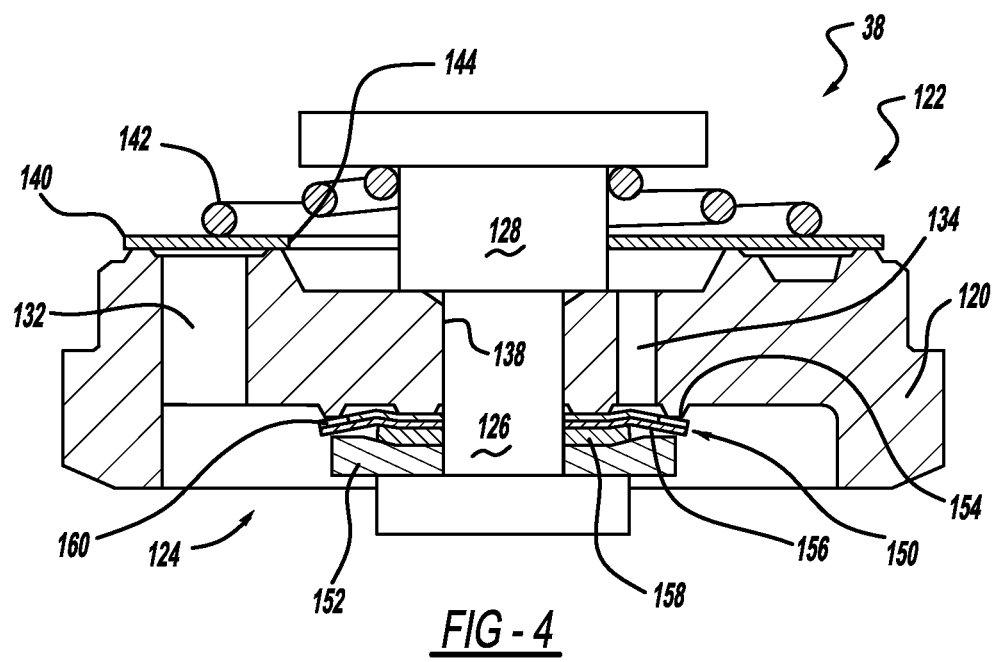
FIG. 4 is an enlarged cross-sectional view of the base valve assembly in accordance with the present invention.

Referring now to FIG. 4, base valve assembly 38 comprises a valve body 120, an intake or rebound fluid valve assembly 122, a compression valve assembly 124, a retaining bolt 126 and a retaining nut 128. Valve body 120 is secured to pressure tube 30 and end cap 54 by press fitting or by other methods known well in the art. End cap 54 is secured to reservoir tube 36 and it defines a plurality of fluid passages 130 which allow communication between reservoir chamber 52 and base valve assembly 38. Valve body 120 defines a plurality of intake or rebound fluid passages 132, a plurality of compression passages 134, and a central bore 138. Retaining bolt 126 extends through central bore 138 and threadingly engages retaining nut 128 to secure both rebound fluid valve assembly 122 and compression valve assembly 124 to valve body 120.

Rebound fluid valve assembly 122 comprises a valve disc 140 and a valve spring 142. Valve disc 140 is an annular member which defines an internal bore 144 for allowing fluid flow to reach compression passages 134 as described below. Valve disc 140 is biased against the upper surface of valve body 120 by valve spring 142 which is located between valve disc 140 and retaining nut 128. Valve disc 140 closes the plurality of rebound fluid passages 132. During a rebound stroke of shock absorber 20, fluid pressure decreases in lower working chamber 46 until the fluid pressure within reservoir chamber 52 and rebound fluid passages 132 is capable of overcoming the biasing force of valve spring 142. When the biasing force exerted by valve spring 142 is exceeded by fluid pressure acting against valve disc 140, valve disc 140 is moved away from valve body 120 to allow fluid flow from reservoir chamber 52 to lower working chamber 46.

Compression valve assembly 124 comprises a plurality of valve members 150 and a retainer 152. Retainer 152 is disposed between valve members 150 and retaining bolt 126. Valve members 150 are slidingly received on retaining bolt 126 and abut valve body 120 to close compression passages 134 while leaving rebound fluid passages 132 open. Retainer 152 is also slidingly received on retaining bolt 126 and it abuts valve members 150. Retaining nut 128 clamps retainer 152 against valve members 150 and valve members 150 against valve body 120. The plurality of valve members 150 comprise a bleed disc 154, a valve disc 156 and a fulcrum 158. Bleed disc 154 includes at least one slot 160 which permits a limited amount of bleed flow bypassing compression valve assembly 124. Fulcrum 158 provides a fulcrum or bending point for bleed disc 154 and valve disc 156. When fluid pressure is applied to discs 154 and 156, they will elastically deflect at the outer peripheral edge of fulcrum 158 to open compression valve assembly 124.

During a compression stroke, fluid in lower working chamber 46 is pressurized causing fluid pressure to react against valve discs 154, 156. A controlled amount of fluid will flow through slot 160 of bleed disc 154. Once the flow through slot 160 is saturated, fluid pressure will increase in lower working chamber 46. When the fluid pressure reacting against valve discs 154, 156 overcomes the bending load for valve discs 154, 156, valve discs 154, 156 elastically deflect opening compression passages 134 allowing fluid flow from lower working chamber 46 to reservoir chamber 52. The stiffness of valve discs 154, 156, the size of compression passages 134 and the design of fulcrum disc 158 will determine the damping characteristics for shock absorber 20 in compression. Prior to the deflection, the controlled amount of fluid flows from lower working chamber 46 to reservoir chamber 52 through slot 160 to provide low speed tunability.

Figure 5:
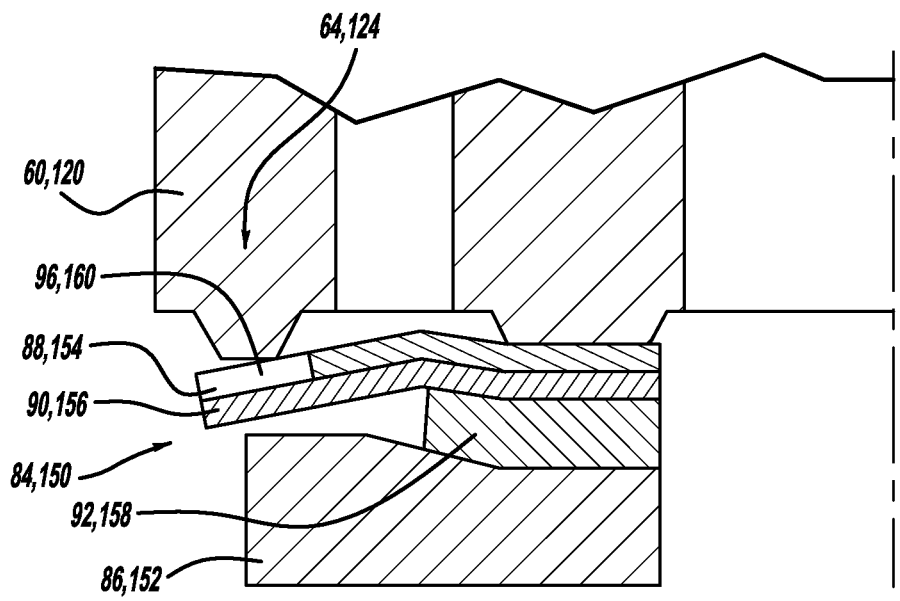
FIG. 5 is an enlarged view of the valve assembly on the piston assembly and the base valve assembly illustrated in FIGS. 3 and 4.

Referring now to FIG. 5, rebound valve assembly 64 and compression valve assembly 124 are illustrated in greater detail. Rebound valve assembly 64 and compression valve assembly 124 include the same or similar components. Retainer 86 and 152 are manufactured to have a concave shape face in the direction of valve members 84, 150 which directly engages fulcrum 92 and 158, respectively. During the assembly of rebound valve assembly 64 and compression valve assembly 124, the tightening of nut 68 and 128 clamps retainer 86 and 152 against valve members 84 and 150 respectively, causing valve members 84 and 150 to elastically deflect and conform to the concave shape of retainer 86 and 152. Fulcrum 92, 158 is therefore a concave fulcrum in its assembled condition such that an outer periphery or fulcrum diameter of fulcrum 92, 158 preloads valve disc 88, 90; 154, 156 in a direction towards valve body 60, 120. The concave nature of fulcrum 92, 158 causes valve discs 88, 90; 154, 156 to be bent into the gap between the inner land or hub and the outer land to form a convex shape in relation to valve body 60, 120. The bending of valve discs 88, 90; 154, 156 into this gap will lead to a higher pressure required to lift the valve discs 88, 90; 154, 156 off of the outer land of valve body 60, 120. Fulcrum 92, 158 with varying degrees of concavity can be used as tuning options to provide different valve opening characteristics to provide different damping characteristics. The amount of concavity of fulcrum 92, 158 will be determined by the amount of concavity of retainer 86, 152.

Fulcrum disc 92, 158 has a first surface adjacent piston rod 34 that engages valve discs 84, 150 at a first position and a second surface spaced radially outward from the first surface that engages valve discs 84, 150 at a second position. The second position is spaced from the first position in a direction toward valve body 60, 120. As illustrated, the second surface is closer to valve body 60, 120 than the first surface. Because valve members 84, 150 will deflect at the outer edge of fulcrum 92, 158, the amount of concavity or the degree of differences between the location of the two positions or surfaces can be used to tune the damping forces for the shock absorber. As illustrated, the second surface is spaced radially outward from the first surface. The second surface or fulcrum diameter must be larger in diameter than the first surface or hub diameter on valve body 60, 120. A space must be formed between the first position which is the diameter of the inside contact between valve members 84, 150 and valve body 60, 120 and the second position which is the fulcrum diameter of fulcrum 92, 158.

The concave shape of fulcrum 92, 158 between the inner land or hub and the outer diameter of fulcrum 92, 158 determines the amount of bending or pre-stressing of valve discs 88, 90; 154, 156. The fulcrum shape inside the inner land or hub and/or outside the pivot diameter could have many different shapes or profiles to provide a controlled but varying pre-stress at angular locations around the valve discs.

Figure 6:
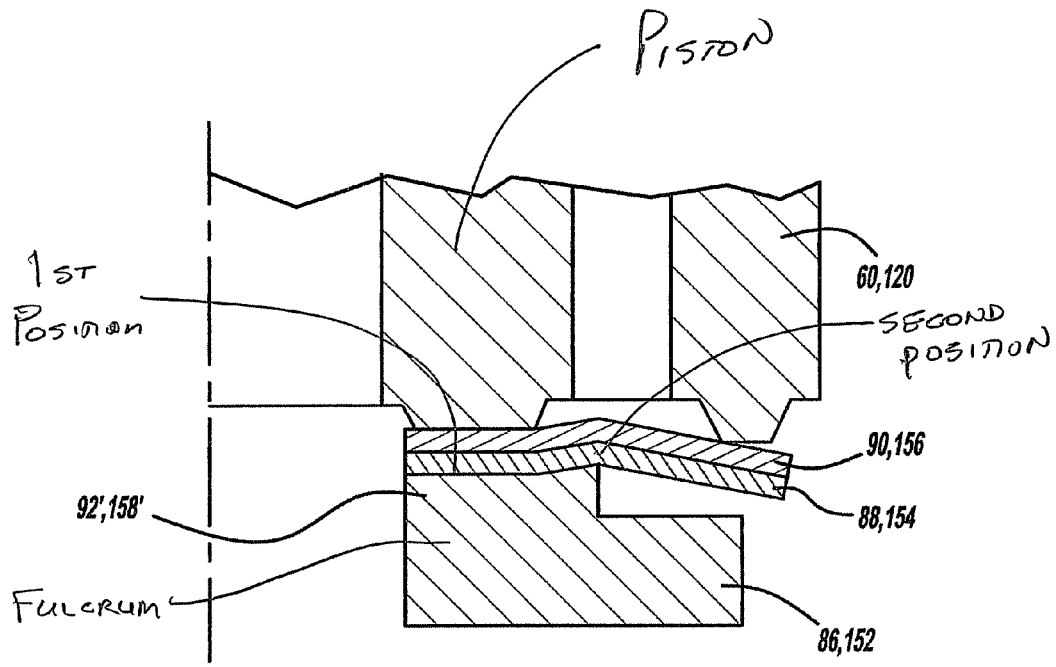
FIG. 6 is an enlarged view of a valve assembly in accordance with another embodiment of the present disclosure.

FIG. 6 illustrates a fulcrum 92' or 158' which is a replacement for fulcrum 92, 158 and retainer 86, 152. Fulcrum 92', 158' is integral or one-piece with retainer 86 or 152, respectively. In this embodiment, the concave shape is formed directly on fulcrum 92', 158'.

Figure 7:
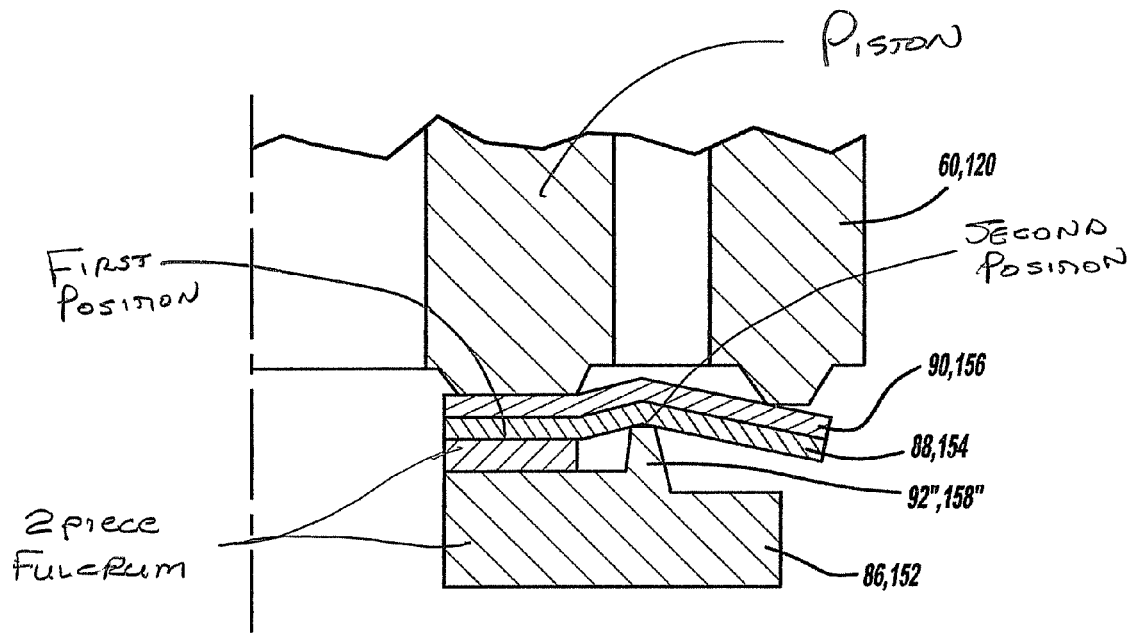
FIG. 7 is an enlarged view of a valve assembly in accordance with another embodiment of the present disclosure.

FIG. 7 illustrates a fulcrum 92" or 158" which is a replacement for fulcrum 92, 158 and retainer 86, 152. Fulcrum 92", 158" is in the form of an annular ridge formed integrally or one piece with retainer 86 or 152, respectfully. In this embodiment, the concave shape is formed directly on fulcrum 92", 158".

Figure 8:
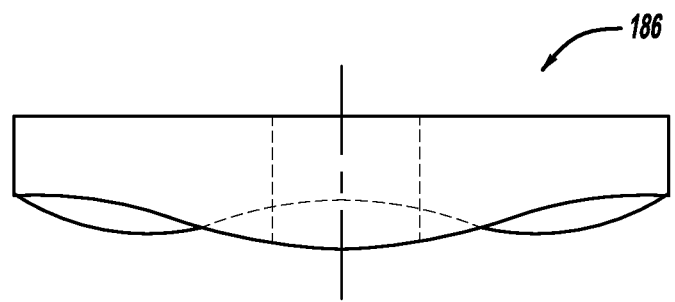
FIG. 8 is an enlarged view of a support washer in accordance with another embodiment of the present disclosure.

FIG. 8 discloses a retainer 186 which is a replacement for retainers 86 and 152. Retainer 186 has a varying depth of concavity. The varying depth of concavity will cause portions of fulcrums 92 and 158 to have a varying depth of concavity which will cause portions of valve discs 88, 90; 154, 156 to bend prior to other portions of valve discs 88, 90; 154, 156 creating a stepped or ramped opening for the valve assembly.

Figure 9:
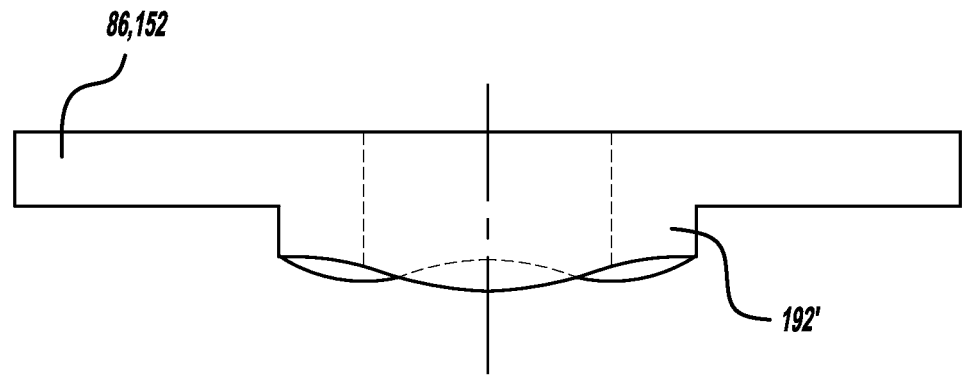
FIG. 9 is an enlarged view of a support washer in accordance with another embodiment of the present disclosure.

FIG. 9 discloses a fulcrum 192' which is a replacement for fulcrum 92' illustrated in FIG. 6 where fulcrum 92', 158' is integral with retainer 86, 152. Fulcrum disc 192' is integral or one piece with retainer 86, 152 and includes the varying depth of concavity similar to fulcrum 192. In this embodiment, the varying depth of concavity is formed directly on fulcrum 192'.

Figure 10:
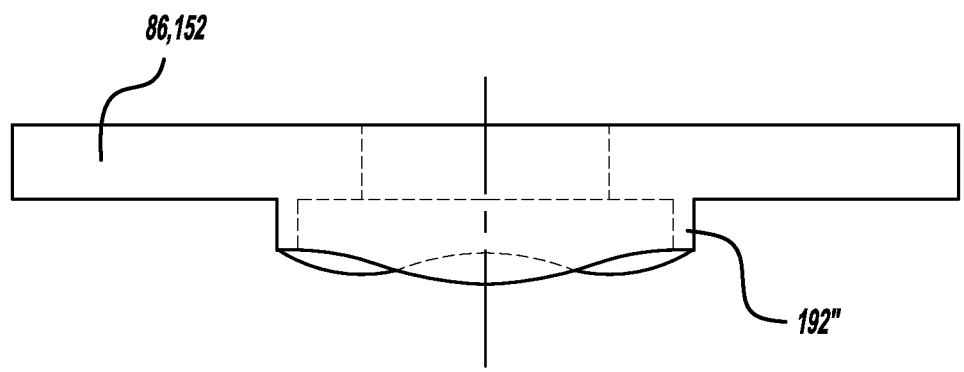
FIG. 10 is an enlarged view of a support washer in accordance with another embodiment of the present disclosure.

FIG. 10 discloses fulcrum 192" which is a replacement for fulcrum 92" illustrated in FIG. 7. Fulcrum 192" is in the form of an annular ridge formed integral or one piece with retainer 86, 152 and includes the varying depth of concavity similar to fulcrum disc 192. In this embodiment, the varying depth of concavity is formed directly on fulcrum 192".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
    a pressure tube forming a fluid working chamber;
    a piston disposed within said fluid chamber, said piston dividing said fluid chamber into an upper working chamber and a lower working chamber, said piston defining a fluid passage;
    a piston rod attached to said piston, said piston rod extending through said fluid working chamber;
    a valve assembly attached to said piston, said valve assembly comprising:
        one or more valve discs disposed adjacent said piston, said one or more valve discs closing said fluid passage; and
        a fulcrum disposed adjacent said one or more valve discs, said fulcrum directly engaging said one or more valve discs at a first position adjacent said piston rod and directly engaging said one or more valve discs at a second position spaced from said piston rod, said second position being spaced from said first position in a direction toward said piston.

2. The shock absorber according to claim 1, wherein said valve disc has a convex shape with respect to said piston.

3. The shock absorber according to claim 1, wherein said valve assembly further comprises a retainer disposed adjacent said fulcrum disc.

4. The shock absorber according to claim 3, wherein said fulcrum and said retainer form a single piece component.

5. The shock absorber according to claim 3, wherein said retainer has a concave surface engaging said fulcrum.

6. The shock absorber according to claim 1, wherein said fulcrum includes an annular ridge at said second position.

7. The shock absorber according to claim 6, wherein said valve assembly further comprises a retainer disposed adjacent said fulcrum.

8. The shock absorber according to claim 7, wherein said fulcrum and said retainer form a single piece component.

9. The shock absorber according to claim 1, wherein said fulcrum defines a surface at said second position, said surface having a variable spacing from said first position in the direction towards said piston.

10. The shock absorber according to claim 9, wherein said valve assembly further comprises a retainer disposed adjacent said fulcrum.

11. The shock absorber according to claim 10, wherein said fulcrum and said retainer form a single piece component.

12. The shock absorber according to claim 1, wherein said fulcrum has a concave shape with respect to said piston.

13. A shock absorber comprising:
    a pressure tube forming a fluid chamber;
    a valve body engaging said pressure tube, said valve body defining a fluid passage;
    a valve assembly attached to said valve body, said valve assembly comprising:
        one or more valve discs disposed adjacent said valve body, said one or more valve discs closing said fluid passages;
        a fulcrum disposed adjacent said one or more valve discs, said fulcrum having a first surface directly engaging said one or more valve discs at a first position, said fulcrum having a second surface directly engaging said one or more valve discs at a second position, said second position being located radially outward from said first position, said second surface being disposed closer to said valve body than said first surface.

14. The shock absorber according to claim 13, wherein said valve disc has a convex shape with respect to said valve body.

15. The shock absorber according to claim 13, wherein said valve assembly further comprises a retainer disposed adjacent said fulcrum.

16. The shock absorber according to claim 15, wherein said fulcrum and said retainer form a single piece component.

17. The shock absorber according to claim 15, wherein said retainer has a concave surface engaging said fulcrum.

18. The shock absorber according to claim 13, wherein said fulcrum includes an annular ridge at said second position.

19. The shock absorber according to claim 18, wherein said valve assembly further comprises a retainer disposed adjacent said fulcrum.

20. The shock absorber according to claim 19, wherein said fulcrum and said retainer form a single piece component.

21. The shock absorber according to claim 13, wherein said fulcrum defines a surface at said second position, said surface having a variable spacing from said first position in a direction towards said valve body.

22. The shock absorber according to claim 21, wherein said valve assembly further comprises a retainer disposed adjacent said fulcrum.

23. The shock absorber according to claim 22, wherein said fulcrum and said retainer form a single piece component.

24. The shock absorber according to claim 13, wherein said fulcrum has a concave shape with respect to said valve body.

\* \* \* \* \*